US007246007B2

(12) United States Patent
Ferman

(10) Patent No.: US 7,246,007 B2
(45) Date of Patent: Jul. 17, 2007

(54) SYSTEM AND METHOD OF COMMUNICATING TRAFFIC INFORMATION

(75) Inventor: Martin A. Ferman, Huntington Woods, MI (US)

(73) Assignee: General Motors Corporation, Detroit, MI (US)

( * ) Notice: Subject to any disclaimer, the term of this patent is extended or adjusted under 35 U.S.C. 154(b) by 162 days.

(21) Appl. No.: 10/808,072

(22) Filed: Mar. 24, 2004

(65) Prior Publication Data

US 2005/0216147 A1 Sep. 29, 2005

(51) Int. Cl.
*G01C 21/00* (2006.01)

(52) U.S. Cl. ...................... 701/200; 701/117; 701/118; 701/119; 340/934; 340/992

(58) Field of Classification Search ................. 701/29, 701/200, 117, 118, 119; 340/934, 992, 995.13
See application file for complete search history.

(56) References Cited

U.S. PATENT DOCUMENTS 5,164,904 A 11/1992 Sumner
5,182,555 A 1/1993 Sumner
5,539,645 A 7/1996 Mandhyan et al.
5,699,056 A * 12/1997 Yoshida ...................... 340/905
6,012,012 A 1/2000 Fleck et al.
6,061,625 A * 5/2000 Fastenrath .................. 701/117
6,092,020 A * 7/2000 Fastenrath et al. .......... 701/119
6,121,924 A * 9/2000 Meek et al. ........... 342/357.13
6,233,517 B1 * 5/2001 Froeberg .................... 701/117
6,329,932 B1 * 12/2001 Fastenrath .................. 340/934
6,505,114 B2 * 1/2003 Luciani ...................... 701/117
6,580,390 B1 6/2003 Hay
2003/0009277 A1 * 1/2003 Fan et al. .................. 701/117
2003/0144790 A1 * 7/2003 MacPhail et al. ........... 701/117
2004/0243298 A1 * 12/2004 Knuuttila et al. ........... 701/117

* cited by examiner

*Primary Examiner*—Thomas Black
*Assistant Examiner*—Marie A Weiskopf
(74) *Attorney, Agent, or Firm*—Kathryn A. Marra

(57) ABSTRACT

A system and method of automatically communicating traffic information from a traffic probe vehicle to a traffic information and management system when the probe vehicle is operated within an active traffic information reporting region. Geographic information about a traffic reporting region, or plurality of regions, is stored in the probe vehicle as an array of geographic cells so as to reduce the data storage requirements. The geographic cells have associated with them certain cell parameters related to the cell, such as a recording priority, a recording interval and a reporting interval. The recording priority of a cell may be associated with certain roadway types located within that cell. As a probe vehicle travels within an active traffic information reporting region, its location is established within the traffic information reporting region and a corresponding geographic cell.

7 Claims, 9 Drawing Sheets

SYSTEM AND METHOD OF COMMUNICATING TRAFFIC INFORMATION

TECHNICAL FIELD

This invention relates to a system and method of communicating traffic information. More specifically, this invention relates a method of communicating traffic information between a vehicle and a traffic information system. This invention particularly relates to a system and method of automatically communicating traffic information between a probe vehicle and a traffic information system by prioritizing the recording and transmission of vehicle data from the probe vehicle.

BACKGROUND OF THE INVENTION

The use of probe vehicles to collect and transmit information about current traffic conditions for use in conjunction with a traffic information and management system has been proposed previously. Traffic probe vehicles are vehicles that are specifically equipped to obtain, store and transmit traffic-related information. They may comprise vehicles that are specifically designated and equipped for the purpose of providing such information, or vehicles that are being used in ordinary service, such as commercial vehicles, fleet vehicles or passenger vehicles, and that are also equipped to obtain, store and transmit traffic-related information in conjunction with such service.

Relatively low concentrations (e.g. less than 10%) of probe vehicles in an entire population of vehicles can provide significant information on traffic conditions on the various types of roadways in a particular geographic area. Estimates of traffic speeds and travel times based on information received from probe vehicles can be more accurate, and provide traffic information having higher resolution and greater geographic coverage than that available from other types of traffic information systems.

A significant challenge associated with acquiring and processing real-time traffic information from probe vehicles is the cost of transmitting voluminous raw data from the vehicles to a traffic information system. While estimates of these costs have been reduced dramatically as the costs of wireless data transmission have been reduced, nevertheless, it is believed that the economic viability of probe-based traffic information systems will require the implementation of communication methods which reduce the volume of information communicated and the frequency of communication, thereby reducing the communication-related expenses. Methods which have been suggested to reduce the amount of data transmitted have generally included both data compression and data reduction algorithms. While implementation and improvement of both methods are desirable, improvements in data reduction methods are particularly desirable if they can typically be implemented in existing hardware and vehicular systems relatively quickly and with a relatively smaller number of changes, thereby reducing or eliminating the need for extensive and costly modifications, qualifications and other testing.

When using probe vehicle based traffic information systems, each vehicle independently collects, stores, and transmits its own raw data according to a predetermined data storage and transmission algorithm. Therefore, any strategy or method for reducing the data transmitted must ultimately be implemented by the individual vehicle.

While various approaches have been suggested to enable the collection, storage, transmission and use of probe vehicle data, including selective transmission schemes, such approaches have certain disadvantages in that they typically require the use of dedicated hardware, software or both, or do not provide sufficient flexibility or selectivity with regard to the prioritization, collection or transmission of traffic information for a particular roadway, or require specialized and expensive data collection or processing systems, or combinations of these limitations.

Based on the limitations noted above, none of the existing methods are optimal for providing real-time traffic information about a traffic network comprising a large number (i.e., many thousands and perhaps millions) of individually owned and operated vehicles that are free to drive anywhere at any time over a network of hundreds or perhaps thousands of roadways as is the situation in many major metropolitan areas or traffic corridors.

Therefore, it is desirable to develop a method of obtaining storing and communicating traffic information that reduces the amount of information that must be communicated, and hence the associated communication costs, between the probe vehicles and the traffic information system and that utilizes existing vehicle systems, such as on-board global positioning systems, cellular communications systems and vehicle control systems to reduce the cost of implementing such a method.

SUMMARY OF THE INVENTION

This invention is a system and method of automatically communicating vehicle data comprising traffic information between a probe vehicle and a vehicle data collection or traffic information system by prioritizing the recording and reporting of vehicle data from the probe vehicle.

The system includes a vehicle that is adapted to record and report vehicle data as a function of a vehicle position which has a vehicle data storage system to record vehicle data and a vehicle communication system which is adapted for wireless communication to report the vehicle data. The system also includes a vehicle data collection system that is adapted to receive and store vehicle data which is adapted to receive wireless communication of the vehicle data from the vehicle.

The method includes the steps of storing information which defines a geographic region in a vehicle, the geographic region comprising a predetermined array of cells, each cell having a cell position; associating a plurality of cell parameters with each cell, the cell parameters comprising a recording interval and a reporting interval; determining a vehicle position relative to the geographic region; wherein if the vehicle is within the geographic region, the vehicle position is correlated to a vehicle cell; recording vehicle data in accordance with the recording interval of the vehicle cell; and reporting the vehicle data to a traffic information system in accordance with the reporting interval.

The system and method are advantageous in that they permit dynamic changes of the cell parameters associated with the roadways in a particular region, such as roadway priorities, thereby permitting a traffic information and management system to monitor an entire region and focus on particular roadways as traffic patterns change and traffic events occur by adjusting the cell parameters of those roadways. The present invention enables a very flexible traffic information system.

The system and method are particularly advantageous when implemented in vehicles having an on-board telematics system, such as the OnStar® System from General Motors Corporation, because only minimal additional hardware or software is needed in the vehicle in order to implement them. Also, such vehicle-based telematic systems also generally have the necessary communication and data processing infrastructure for receiving the vehicle data reported according to the method.

This method is also advantageous because it reduces the amount and frequency of data transmissions from probe vehicles, and hence communications costs, while increasing the communication system's ability to record the desired data quickly. The method of the invention also reduces the impact on the communication network. The method is also advantageous because it can be easily integrated with other vehicle telematics systems and services, and can be scheduled or prioritized so that it does not interfere with them.

BRIEF DESCRIPTION OF THE DRAWINGS

The present invention will be more fully understood from the accompanying drawings, in which.

DESCRIPTION OF THE PREFERRED EMBODIMENT

Referring to FIGS. 1-8, the present invention is a method 300 of reporting information, such as vehicle data or traffic-related information, from a vehicle. Method 300 comprises a series of steps for using the vehicle to obtain, store and report the vehicle data or traffic-related information to a centralized system, such as a vehicle data collection or traffic information and management system. The present invention also comprises a system for collecting vehicle data from a vehicle in accordance with the method.

Figure 1:
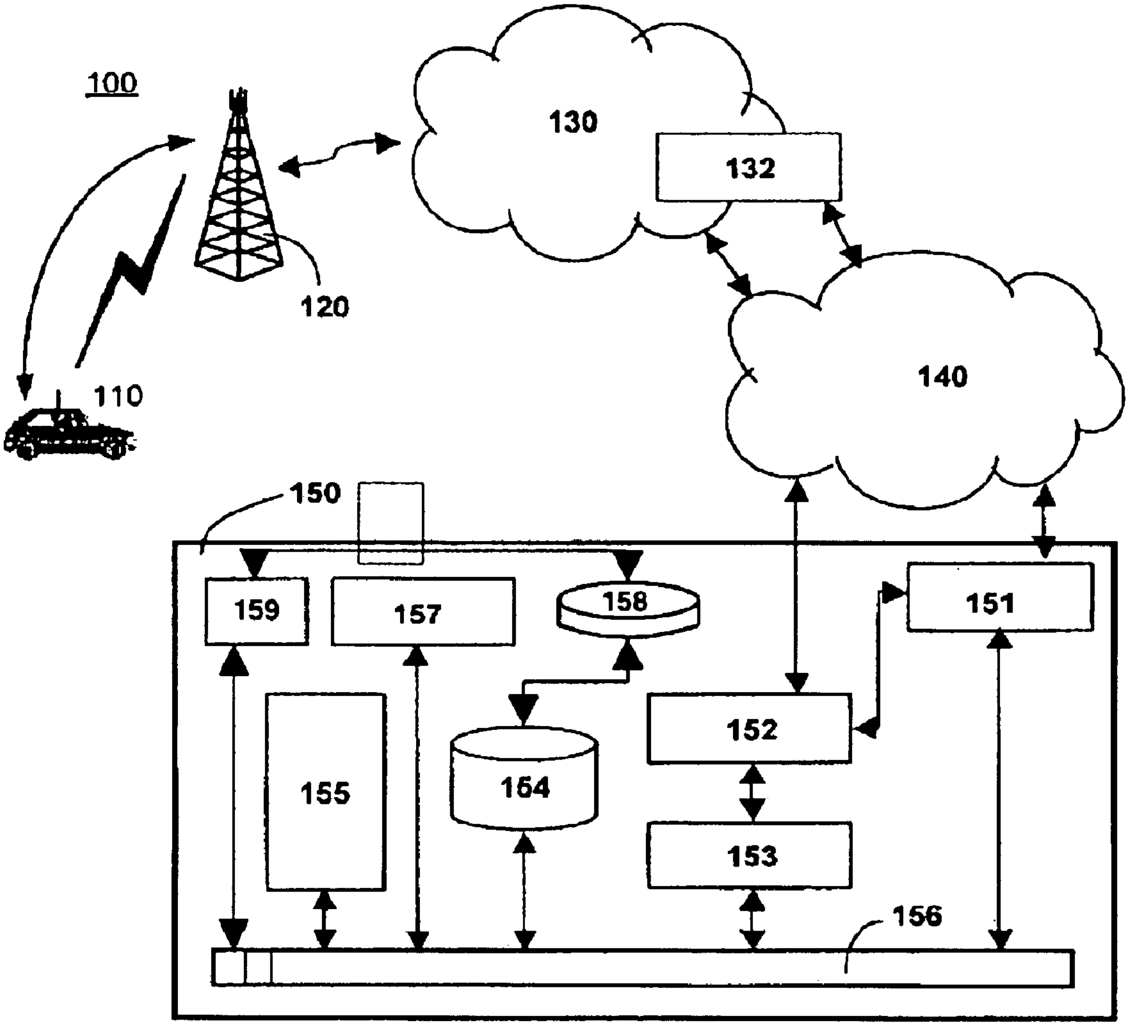
FIG. 1 is a schematic illustration of one embodiment of a system for communication with a vehicle using a wireless communication system in accordance with the present invention.

FIG. 1 shows an illustration of one embodiment of a system for communicating with a mobile communication unit using a wireless communication system in accordance with the present invention, and may be referred to as a mobile communication unit communication system (MCUCS) 100, and in one embodiment may include the OnStar® System from General Motors Corporation as is known in the art. MCUCS 100 may also be referred to herein as vehicle data collection system 100 and may contain one or more mobile communication units 110, one or more wireless carrier systems 120, one or more communication networks 130, one or more short message service centers 132, one or more land networks 140, and one or more call centers 150. Additionally, for one embodiment of the invention the mobile communication units 110 may be a portable unit, an automotive vehicle, an aircraft, and a spacecraft. The portable unit may be for example, a movable transit, or a hand held global positioning system (GPS) device, or other known item that may benefit from the use of communications, as is described throughout this detailed description.

Call center 150 may contain one or more switches 151, one or more data transmission devices 152, one or more communication services managers 153, one or more communication services databases 154, such as one or more vehicle data collection or traffic information databases 158, one or more advisors 155, one or more bus systems 156, and one or more automated speech recognition (ASR) units 157. Vehicle data collection databases 158 may be used to collect vehicle data and aggregate vehicle data from a plurality of vehicles. Vehicle data collection databases 158 may also provide vehicle data to or for one or more vehicle data processing systems 159. The vehicle data processing systems 159 comprise data processing means for processing vehicle data from one or more vehicles to produce traffic-related information that may be provided back to vehicle 200 or other vehicles, either as a subscription service or public service or otherwise, and may thereby be used to provide information about and/or manage traffic flow within a particular geographic region, as further described herein, and may also be referred to as traffic information and management systems 159. For example, traffic information and management systems 159 may access vehicle data such as the vehicle speed of a vehicle, or plurality of vehicles, on a given roadway, or roadway segment, to determine an average traffic speed for that roadway, which may be used directly or combined with other information to develop traffic-related information. Likewise, ambient temperature may be used to determine an average ambient temperature, or further combined with elevation information to determine ambient temperature as a function of elevation. Similarly, vehicle yaw rates or lateral acceleration data may be aggregated and analyzed to assess roadway conditions (e.g., dry pavement versus wet or icy pavement), such as by considering whether vehicles are exhibiting yaw rates or lateral accelerations other than those normally associated with dry pavement. Suspension related information may also be accessed and processed to assess the condition of the surface of a particular roadway. As may be seen from this illustration, system 100 and method 300 may be used to develop many types and combinations of road and traffic-related information.

Mobile communication unit 110 may contain a wireless mobile communication unit communication system device or module (MCUCS module) such as an analog or digital phone with suitable hardware and software for transmitting and receiving data communications. Mobile communication unit 110 may contain a wireless modem for transmitting and receiving data. Mobile communication unit 110 may contain a digital signal processor with software and additional hardware to enable communications with the mobile communication unit and to perform other routines and requested services. Mobile communication unit 110 may contain a global positioning system (GPS) unit capable of determining synchronized time, geophysical location (i.e., latitude, longitude, elevation) and other GPS parameters related to the accuracy of the GPS position associated with mobile communication unit 100. The GPS unit may also be a differential GPS unit capable of latitudinal and longitudinal positional accuracies on the order of 1 m. Mobile communication unit 110 may send and receive radio transmissions, including AM, FM and XM radio transmissions, to and from wireless carrier system 120. Mobile communication unit 110 may contain a speech recognition system (ASR) capable of communicating with the wireless vehicle communication device. The MCUCS module may additionally be capable of functioning as any part or all of the above communication devices and may be adapted to provide vehicle data storage and/or vehicle data retrieval, and/or receiving, processing, and transmitting of vehicle data queries.

Wireless carrier system 120 may be any wireless communications carrier or a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may also include all forms of radio communication, including Dedicated Short Range Communications (DSRC), AM, FM, XM and other radio frequency communication. Wireless carrier system 120 may transmit to and receive signals from mobile communication unit 110. Wireless carrier system 120 may transmit to and receive signals from a second mobile communication unit 110. Wireless carrier system 120 may be connected with communications network 130.

Communications network 130 may comprise a mobile switching center. Communications network 130 may comprise services from one or more wireless communications companies. Communications network 130 may be any suitable system or collection of systems for connecting wireless carrier system 120 to at least one mobile communication unit 100 or to a call center.

Communications network 130 may include one or more short message service centers 132. Short message service center 132 may prescribe alphanumeric short messages to and from mobile communication units 110. Short message service center 132 may include message entry features, administrative controls, and message transmission capabilities. For one embodiment of the invention, the short message service center 132 may include one or more automated speech recognition (ASR) units. Short message service center 132 may store and buffer the messages. Short message services may include functional services such as paging, text messaging and message waiting notification. Short message services may include other telematic services, such as broadcast services, time-driven message delivery, autonomous message delivery, and database-driven information services. The telematic services may further include message management features, such as message priority levels, service categories, expiration dates, cancellations, and status checks.

Land network 140 may be a public-switched telephone network. Land network 140 may be comprised of a wired network, including cable system based networks, an optical network, a fiber optic network, another wireless network, or any combination thereof. Land network 140 may comprise an Internet Protocol (IP) network. Land network 140 may connect communications network 130 to a call center. In one embodiment of the invention, a communication system may reference all or part of the wireless carrier system 120, communications network 130, land network 140, and short message service center 132.

Land network 140 may connect a first wireless carrier system 120 with a second wireless carrier system 120. Communication network 130 and land network 140 may connect wireless carrier system 120 to a communication node or call center 150.

Call center 150 may be a location where many calls can be received and serviced at the same time, or where many calls may be sent at the same time. The call center may be a telematic call center, prescribing communications to and from mobile communication units 110. The call center may be a voice call center, providing verbal communications between an advisor in the call center and a subscriber in a mobile communication unit. The call center may be a voice activated call center, providing verbal communications between an ASR unit and a subscriber in a mobile communication unit. The call center may be an automated data processing center, providing automated transfer and processing of data between mobile communications unit 110 or other devices as described herein and call center 150. The call center may contain any of the previously described functions and any combinations thereof.

The call center may contain switch 151. Switch 151 may be connected to land network 140, and may receive a modem signal from an analog modem or from a digital modem. Switch 151 may transmit voice or data transmission from the communication node. Switch 151 may also receive voice or data transmissions from mobile communication unit 110 through wireless carrier system 120, communications network 130, and land network 140 or combinations thereof. Switch 151 may receive from or send data transmissions to data transmission device 152. Switch 151 may receive from or send voice transmissions to advisor 155 via bus system 156. Switch 151 may receive from or send voice transmissions to one or more automated speech recognition (ASR) units 157 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, one or more automated speech recognition (ASR) units 157, and any other device connected to bus system 156. Data transmission device 152 may convey information received from short message service center 132 in communication network 130 to communication services manager 153.

Communication services manager 153 may be connected to switch 151, data transmission device 152, and advisor 155 through bus system 156. The call center may contain any combination of hardware or software facilitating data transmissions between call center 150 and mobile communication unit 110.

Communication services manager 153 may receive information from mobile communication unit 110 through wireless carrier system 120, short message service center 132 in communication network 130, land network 140, and data transmission device 152. Communication services manager 153 may send information to mobile communication unit 110 through data transmission device 152, land network 140, communication network 130 and wireless carrier system 120. Communication services manager 153 may transfer information between mobile communication unit 110 from communication services database 154, such as the transfer of traffic information or data reported from vehicle 200 to traffic information database 158 or other device for receiving traffic information according to method 300, as described herein. Communication services manager 153 may send short message service messages via short message service center 132 to the mobile communication unit. Communication services manager 153 may receive short message service replies from mobile communication unit 110 via short message service center 132. Communication services manager 153 may send a short message service request to mobile communication unit 110. Communication services manager 153 may receive from or send voice transmissions to one or more automated speech recognition (ASR) units 157.

In another embodiment of the invention, short message service (SMS) communications may be sent and received according to established protocols such as IS-637 standards for SMS, IS-136 air interface standards for SMS, and GSM 03.40 and 09.02 standards. These protocols allow for example, short messages comprised of up to 160 alphanumeric characters and may contain no images or graphics. Similar to paging, an SMS communication may be posted along with an intended recipient, such as a communication device in mobile communication unit 110. The SMS communication may be sent by a communication services manager in a call center, transferred to a short message service center (SMSC), and conveyed to the intended recipient. In one embodiment of the invention, mobile communication unit 110 may receive an SMS message when the ignition is on, or when put into an SMS-ready or service-ready mode while the ignition is off. The mobile communication unit 110 may be placed in a powered down or quiescent mode while the ignition is off. When the mobile communication unit is placed into a service ready mode, the phone in the mobile communication unit may register with a local wireless carrier if needed, or with the subscriber's home system if the mobile communication unit is not roaming. If an SMS message is waiting to be sent, the wireless carrier may deliver the message and the mobile phone may acknowledge receipt of the message by an acknowledgment to the SMSC. Mobile communication unit 110 may perform an operation in response to the SMS message, and may send an SMS reply message back to the call center. Similarly, another embodiment of the mobile communication unit 110 may originate an SMS message to the call center through the SMSC.

In one embodiment of the invention, the communication services manager 153 may determine whether an SMS communication should be sent to mobile communication unit 110. An SMS message may be initiated in response to a subscriber request, such as a request to unlock the vehicle doors. An SMS message may be sent automatically, for example, when an update or vehicle preset value is desired or when a diagnostic message is needed. In another embodiment of the invention, an SMS message may be sent to periodically check the location and status of mobile communication unit 110, and for another embodiment of the invention, to request data collection, data retrieval, and/or data submission from mobile communication unit 110, for example, the transmission of traffic information according to the method described herein. In yet another embodiment of the invention, an SMS message may be initiated in response to a request from a third party technician, for example a mechanic or engineer providing services to the mobile communication unit 110. This embodiment may provide specific information for individual mobile communication units, for example to provide specific information for the installation and repair of components in communication with the mobile communication unit 110. Communication services manager 153 may also provide further requests and determinations based on a reply from mobile communication unit 110. Communication services manager 153 may provide information to mobile communication unit 110 from communication services database 154.

Communication services database 154 may contain records on one or more mobile communication units 110. A portion of communication services database 154 may be dedicated to short message services. Records in communication services database 154 may include vehicle identification, location information, diagnostic information, status information, recent action information, and vehicle passenger (user) and operator (user) defined preset conditions regarding mobile communication unit 110. In one embodiment of the invention, the communication services database 154 may include a mobile communication unit optimized database. The mobile communication unit optimized database can store and retrieve information relating mobile communication units, global positioning system characteristics, and optimal global positioning system mask angle information. Communication services database 154 may provide information and other support to communication services manager 153 and automated speech recognition (ASR) units 157, and in one embodiment of the invention to external services. External services can be for example, vehicle repair services, rental agencies, marketing firms, GPS installation facilities, traffic information content suppliers and additional manufacturers. Another embodiment of the invention may require external services to be authorized, such as having a multi-use license, or pre-approved such as for a one-time use.

Another embodiment of the invention may provide that communication services database 154 include geographic and/or mapping information that may include geographic features such as roadways, roadway segments, lakes, mountains, businesses, cities, malls, and any other feature that may be identifiable with a given location. The communication services database 154 may also include points of interest that can be spatially enabled, such as golf courses, rest areas, and historical markers.

Advisor 155 may be a real advisor or a virtual advisor. A real advisor may be a human being in verbal communication with mobile communication device 110. A virtual advisor may be a synthesized voice interface responding to requests from mobile communication device 110. Advisor 155 may provide services to mobile communication device 110. Advisor 155 may communicate with communication services manager 153, automated speech recognition (ASR) units 157, or any other device connected to bus system 156. Another embodiment of the invention may allow for the advisor 155 and ASR units 157 to be integrated as a single unit capable of any features described for either.

Figure 2:
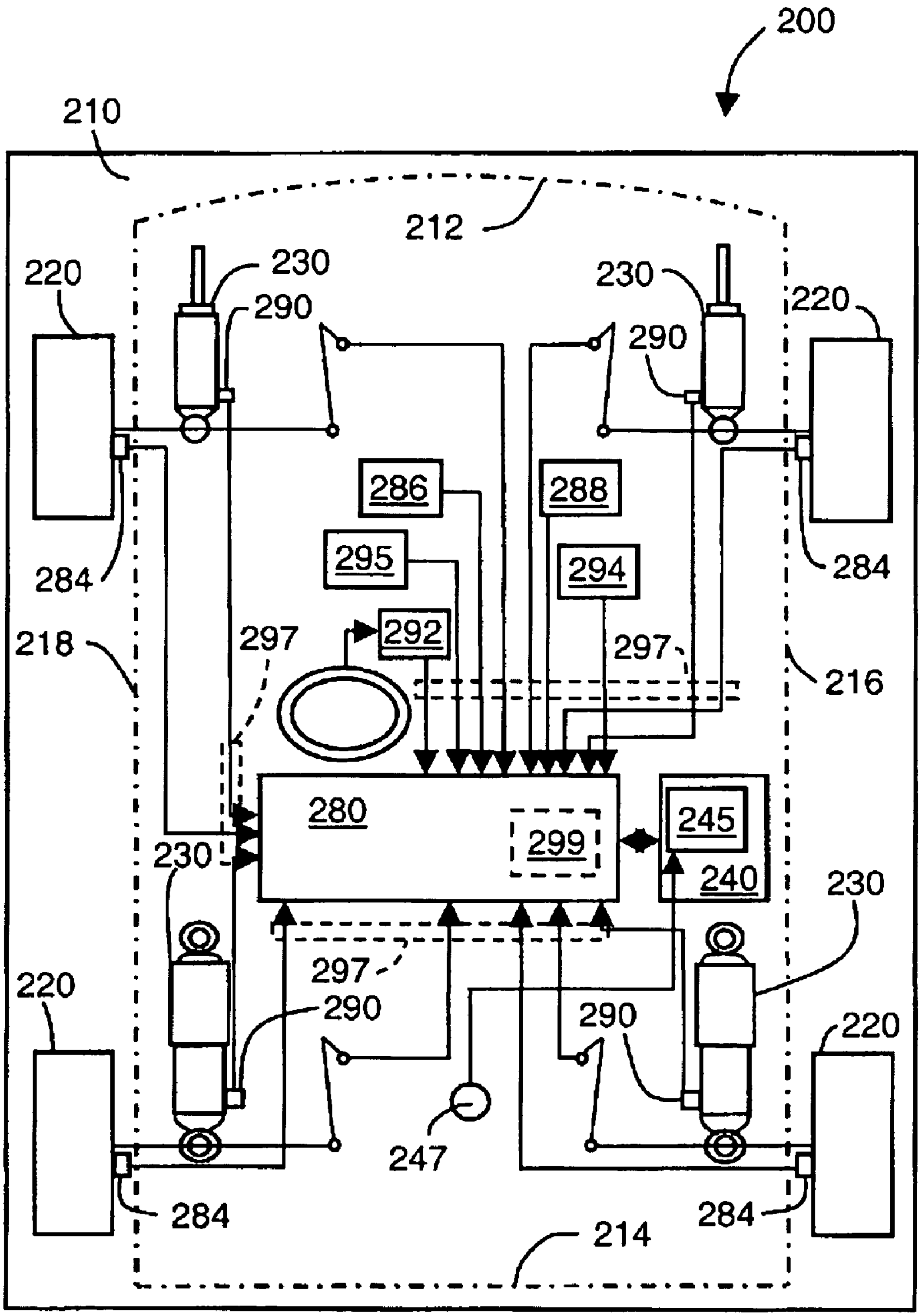
FIG. 2 is a schematic illustration of a vehicle adapted for use in accordance with the present invention.

As illustrated in FIG. 2, in one embodiment mobile communication unit 110 comprises vehicle 200, such as an automotive vehicle. The vehicle 200 may be of conventional construction comprising vehicle chassis or body 210 supported by four wheels 220 and by four suspension devices 230 including springs (not shown), all of a type known in the art. The vehicle chassis or body may be comprised of a front panel 212, rear panel 214, right side panel 216, left side panel 218, hood, trunk, roof, and undercarriage or frame. Vehicle 200 includes a communication control module 240, such as the MCUCS module, which is preferably located within chassis 210. Control module 240 is adapted for two-way communication with system 100 and is in signal communication with a GPS unit 245, including GPS receiver and GPS antenna 247, as well as various other vehicle systems, input output devices and sensors. Communication control module 240 may also be referred to as vehicle communication system 240 and preferably comprises a conventional microprocessor-based controller comprising such common elements as one or more microprocessors, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning, signal processing and buffer circuitry, as well as any necessary storage device, or devices, for storing recorded vehicle data, or communication device, or other devices, such as a wireless phone, modem, network interface card or other communication device adapted for communication of vehicle data to system 100.

Vehicle communication system 240 is also adapted to receive and store information, such as geographic information and cell parameters, as further described herein. This receipt and storage includes both initial receipt and storage of such information, either at the time of vehicle manufacture or after, as well as any update of such information communicated from system 100 or any other source to vehicle 200.

Vehicle communication system 240 may comprise a single module or a plurality of modules, and may also comprise the integration of elements of a number of vehicle systems or devices to accomplish the collection, storage and communication of vehicle data to system 100 and the receipt, storage and use of cell parameters or other information from system 100.

GPS unit 245 is adapted to continuously receive GPS geophysical information via GPS antenna 247, including a synchronized time, latitudinal position, a longitudinal position, an elevational position and other information related to the GPS signals on which these positions are based, including the accuracy of the GPS position. As shown in FIG. 2, GPS unit 245 may comprise a portion of the control module 240, but may also constitute a separate module or device. Control module 240 is preferably in signal communication with vehicle or system controller 280 that monitors and controls overall vehicle operation. Controller 280 is also a conventional microprocessor-based controller comprising such common elements as one or more microprocessors, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning, signal processing and buffer circuitry. Controller 280 functions to acquire data from a plurality of vehicle sensors and provide control of vehicle 200 through one or more vehicle control systems (not shown). Vehicle controller 280 is in signal communication with sensors that are adapted to sense a plurality of dynamic state parameters of vehicle 200, such as wheel speed sensors 284, yaw rate sensor 286, lateral acceleration sensor 288, suspension sensor 290 (e.g. displacement, velocity, or acceleration sensors for sensing vibration inputs that are indicative of the roughness or condition of a roadway or roadway segment), steering angle sensor 292, ambient outdoor temperature sensor 294, compass or heading sensor 295 or other vehicle sensors. Vehicle sensors are adapted to produce a corresponding plurality of sensor signals 297 that are representative of the value of the sensed dynamic state parameters. Sensor signals 297 may be conditioned and processed in controller 280 to produce a corresponding plurality of dynamic state inputs 299, such as vehicle speed, yaw rate, lateral acceleration, steering angle, ambient outdoor temperature, and heading that are available for use in the control of vehicle 200, and that are also available for use by control module 240 for communication as vehicle data or traffic-related information to system 100, together with GPS and other information available from the vehicle, which also comprises vehicle data. Controller 280 may also be used to provide the state or condition of any vehicle system or component as vehicle data, for example, a windshield wiper in the "on" condition for longer than the average time needed to clean the windshield could be used to infer precipitation, or a separate rain sensor may be integrated into vehicle 200 and controller 280. The selection of what vehicle data to communicate from the vehicle 200 is a design choice and may be varied in accordance with the methods described herein.

Traffic probe vehicle 200 may be any automotive vehicle that is equipped to obtain, store and transmit vehicle data or traffic-related information in accordance with method 300. It may comprise vehicle 200 that is specifically designated and equipped for the purpose of providing such information, or a vehicle 200 that is being used in ordinary service, such as a commercial vehicle, fleet vehicle or passenger vehicle, and that is also equipped to obtain, store and transmit vehicle data or traffic-related information in conjunction with such service. It is believed to be particularly advantageous to implement traffic probe vehicles using method 300 by making use of vehicles 200 in conjunction with their ordinary service applications, and to use their existing systems and services, such as integrated on-board cellular or other communication systems comprising control module 240, GPS unit 245, and other vehicle information, telematics or control systems and services, such as those implemented in the OnStar Systems and services from General Motors Corporation, to facilitate the collection and transmission of vehicle data and traffic-related information. Such use is believed to be advantageous because it provides greater utilization of both vehicle 200 systems and services as well as MCUCS 100 and can be scheduled so as to not interfere with current uses of these systems and services. It is also advantageous in that it does not require the creation of stand alone probe vehicles or specialized networks to collect vehicle data. Further, traffic-related information and services based on the vehicle data collected from probe vehicle 200 are believed to be complementary to other services provided by the OnStar System and other telematics systems. In the case where mobile communication unit 110 and vehicle 200 is a boat, airplane or space vehicle, the vehicle sensors and vehicle data or traffic information available may vary in accordance with sensed parameters that are normally associated with such vehicles.

A system 100 and vehicle 200 suitable for implementation of method 300 are more fully described in commonly assigned U.S. Pat. No. 6,580,390, which is hereby incorporated by reference herein in its entirety.

Referring to FIGS. 1-8, the present invention is a method 300 of reporting information, such as traffic-related information or vehicle data, from a vehicle, such as vehicle 200, to a vehicle data collection system, such as system 100. As used herein, traffic-related information or traffic information is intended to comprise all information obtained from vehicle 200, including all vehicle data. Method 300 comprises a series of steps for using vehicle 200 to automatically obtain, store and report the information to a centralized traffic information or vehicle data collection system, such as system 100. System 100 preferably comprises a traffic information and management system having one or more vehicle data collection databases 158 for storing vehicle data received from at least one vehicle 200, and preferably a plurality of vehicles 200, and a vehicle data processing system 159 for processing this data to develop traffic-related information. Method 300 comprises the steps of: storing 310 information which defines a geographic region as an array of geographic cells, each having a unique latitudinal and longitudinal cell position; associating 320 a plurality of cell parameters with each cell, including a recording interval and reporting interval; determining 330 the vehicle position relative to the geographic region; and if the vehicle is within the geographic region, correlating the vehicle position to the corresponding cell in the array to establish a vehicle cell; recording 340 vehicle data in accordance with the recording interval of the vehicle cell; and reporting 350 the vehicle data to a vehicle data collection system in accordance with the reporting interval.

Referring to FIGS. 3-8, method 300 comprises the step of storing 310 information which defines geographic region 400 as an array 410 of geographic cells 420, each cell 420 having a unique cell position comprising a latitudinal position and longitudinal position, and preferably also comprising an elevation position, as well as GPS information associated with the calculation and accuracy of the positions. This geographic information is preferably stored on vehicle 200 in the form of a look-up table, database or other data structure using suitable means for retrievably storing the data structure, as described herein. However, it may be possible with improvements in wireless communications and the related communication bandwidth to store all or some portion of this information off vehicle 200, for example, in some portion of system 100, and to periodically broadcast it to vehicle 200 for use in conjunction with method 300. The information which defines geographic region 400 may take many forms and comprise any of a number of known methods of defining a geographic region. In the embodiment described herein, geographic region 400 comprises a metropolitan area or portion thereof and is represented by an urban geographic box or region having latitudinal and longitudinal boundaries which is divided into an array 410 or grid constituting a plurality of individual cells 420. The cells may be of different sizes and shapes, but in the illustrated embodiment are preferably of the same size and shape. Large metropolitan areas may extend over an area comprising a few thousand square kilometers. Such metropolitan areas comprise typical traffic reporting geographic regions. Typical dimensions for geographic region 400 might be on the order of 0.5 degrees of longitude by 0.5 degrees of latitude (about 50 km on a side or 2500 square kilometers), while a typical cell might be on the order of about 0.002 degrees, or about 200 m, on a side. These are typical dimensions; in practice the size and shape of the array and the number of cells is variable and can be adjusted for the geographic region of interest. A rectangular or square region 400 may be specified, for example, by the latitude and longitude of the southwest corner of the box and either the coordinates of the northeast corner or the number of cells in each direction (north and east). For a region defined by latitudinal and longitudinal coordinates, a rectangular array 410 may be defined by dividing the latitudinal and longitudinal range associated with region 400 by the desired latitudinal and longitudinal size of the cells 420, respectively. It is believed that region 400 may also comprise an array of cells associated with objects or features located within an area of interest, such as the roadways or roadway segments of a metropolitan area.

Figure 3:
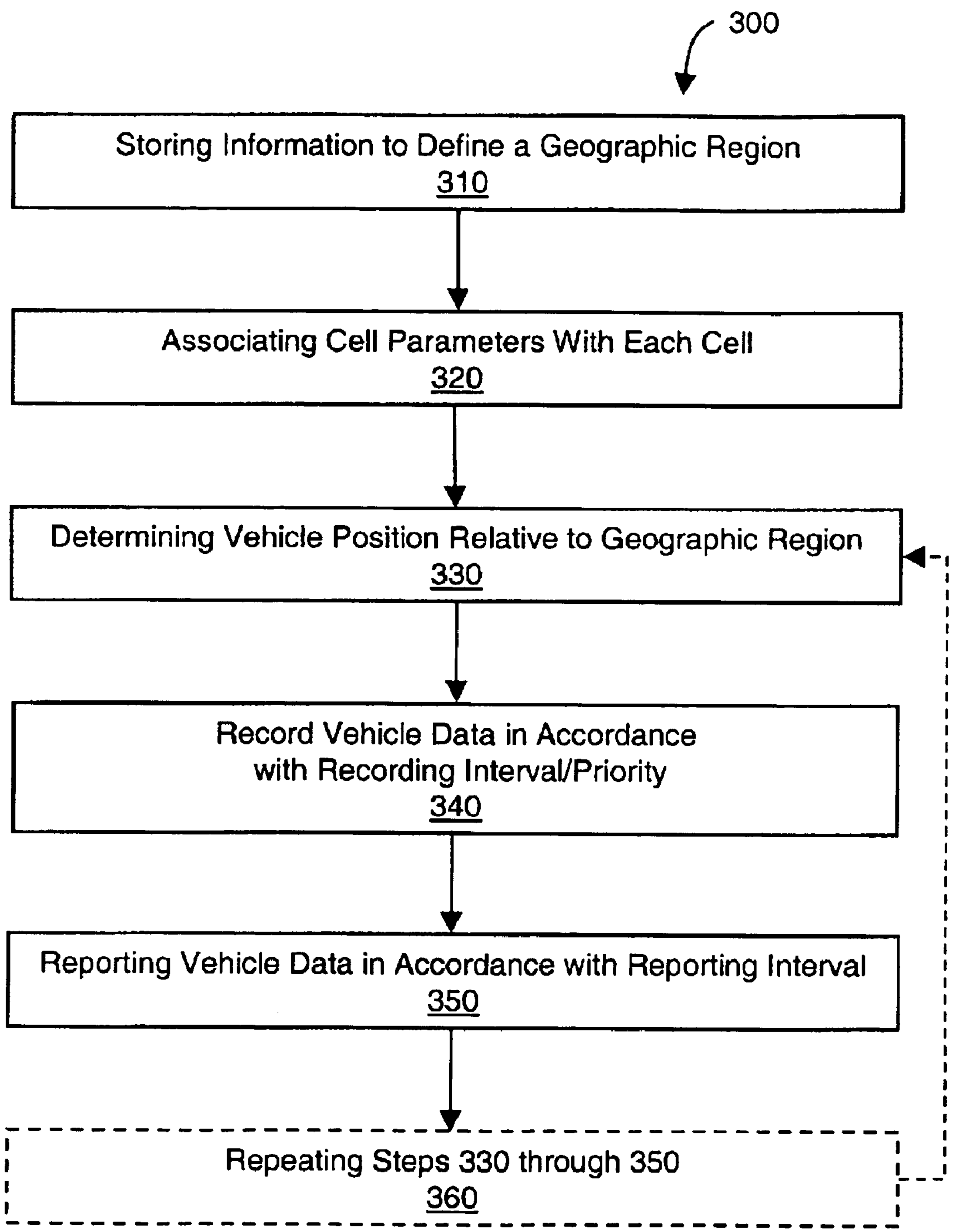
FIG. 3 is a schematic illustration of the steps of the method of the invention.
Figure 6:
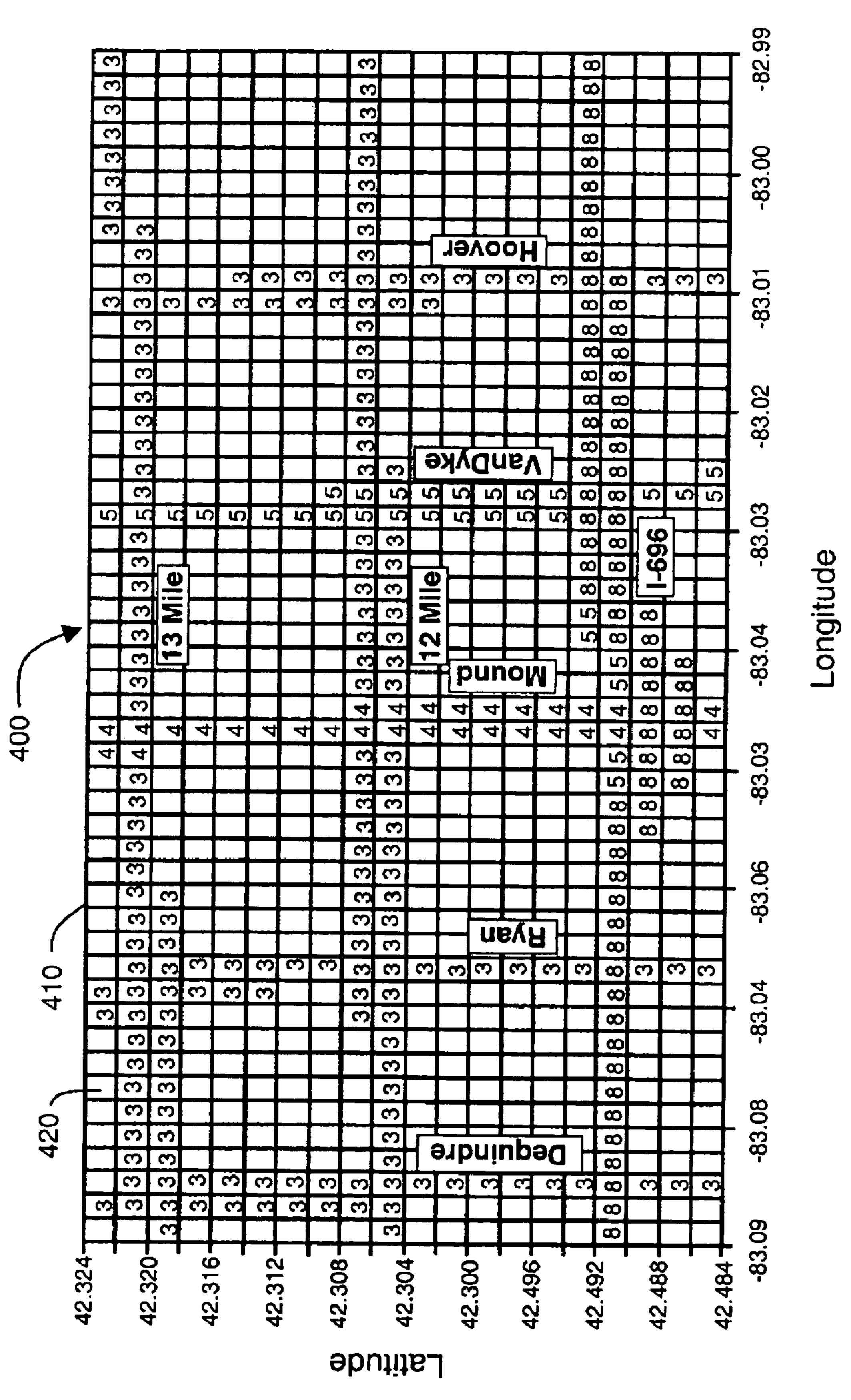
FIG. 6 is a schematic illustration of a geographic region and array of cells of the present invention and associated cell priorities.

Referring to FIGS. 3 and 6 and Table 1, method 300 also comprises the step of associating 320 a plurality of cell parameters with each cell, including a recording or measurement interval ($t_m$) and reporting interval ($t_r$). The recording interval is the time interval at which the vehicle data is recorded, as described herein. The reporting interval is the time interval at which the vehicle data is reported to system 100. As indicated herein, it is preferred that method 300 comprise the step of repeating 360 steps 310-350 for a plurality of cycles, such as by implementing a plurality of control loops associated with communication control module 240. As steps 310-350 are repeated, the cell parameters are the parameters used to control the method of collecting, storing and reporting the vehicle data. The cell parameters may also compromise other parameters associated with the cells which are used to control method 300. Referring to Table 1, the cell parameters may also comprise a recording priority ($T_{(X\ Y)}$) in addition to reporting interval ($t_r$) and measurement interval ($t_m$). Referring to Table 1, the recording priority may be a function of a roadway identifier. The roadway identifier may comprise information associated with the type of roadway or roadway segment, or an identifier that indicates that no roadway or roadway segment is available. As illustrated in Table 1, this roadway type may be related to actual or estimated traffic volumes associated with the roadway or roadway segment. The roadway identifier could also be a roadway name (i.e., State Street) or designator (i.e., I-75, US10). Thus, roadways or roadway segments that lie within a cell may be used as a basis for determining the cell parameters associated with the cell. As illustrated in Table 1, the cell parameters may also have certain interdependencies, for example, the recording interval and reporting interval may be a function of the recording priority. Alternately, once a cell has been characterized, such as by the roadway segments located therein, a recording interval and reporting interval may simply be associated with the cell without the need to also associate a distinct recording priority with the cell. The cell parameters may also identify the vehicle data to be recorded and reported for a given cell, such as vehicle speed or vehicle heading, and may also be updated, as further described herein.

TABLE 1

| Cell Parameters | | | |
|---|---|---|---|
| Recording priority | Roadway Type | Measurement Interval (sec.) | Reporting Interval (min.) |
| 0 | no road | 20 | 99 |
| 1 | local road | 20 | 99 |
| 2 | collector | 20 | 15 |
| 3 | minor arterial | 10 | 10 |
| 4 | principal arterial | 10 | 5 |
| 5 | highway (low volume) | 10 | 5 |
| 6 | freeway (low volume) | 10 | 5 |
| 7 | highway (high volume) | 10 | 5 |
| 8 | freeway (high volume) | 10 | 5 |
| 9 | emergency | 5 | 1 |

A look-up table may also be constructed that contains cell parameters associated with each cell, such as the recording priority, reporting interval and recording interval. The recording priority may be selected so as to correspond to the priority of one or more of the roadways which have a roadway segment that is located within the cell. For example, the recording priority may correspond to the priority of the largest roadway segment in the cell, or the roadway segment which is expected to have the highest traffic volume. The look-up table can be based on existing digital maps or can be constructed from data collected with a GPS-instrumented vehicle. Cells containing major roads may be assigned high recording priorities, while cells with local roads, or with no roads, may have very low priorities.

Probe vehicle 200 maintains an on-board copy of the grid and the associated cell parameters for a particular geographic region 400 of interest, and preferably for a plurality of geographic regions. This may be stored in a suitable means for storing and retrieving the grid and associated cell parameters, such as various forms of non-volatile memory or data storage devices, such as flash memory, hard disk drives, optical drives and media, and other known storage and retrieval means. This information may be stored at the time of manufacture of the vehicle, but preferably may be updated and stored periodically during the operation of vehicle 200 by downloading updated information, including information regarding the geographic region, cell parameters or both, using system 100. For example, as vehicle 200 is driven into a new geographic traffic reporting region 400, it may be desirable to download new information. Geographic regions 400 are not limited to urban areas, but can include any area where traffic conditions are of interest.

These descriptors and cell parameter values are provided only as an example. In practice, the cell parameters may be established as a function of another roadway identifier or characteristic, such as the name of the roadway, the roadway elevation or based on features that are not related to a roadway at all. For example, a group of cells may be associated with a particular area, such as a shopping area, sports stadium, event location or other area of interest. Also, the values of the parameters may be different for different geographic regions, or portions of a given geographic region, and may be changed dynamically as the vehicle is operated, for example in response to traffic conditions or on a particular roadway, or as a function of time (e.g., to accommodate rush hours, holidays, road construction, etc.), or a function of the weather or other factors that are known to affect traffic.

Figure 4:
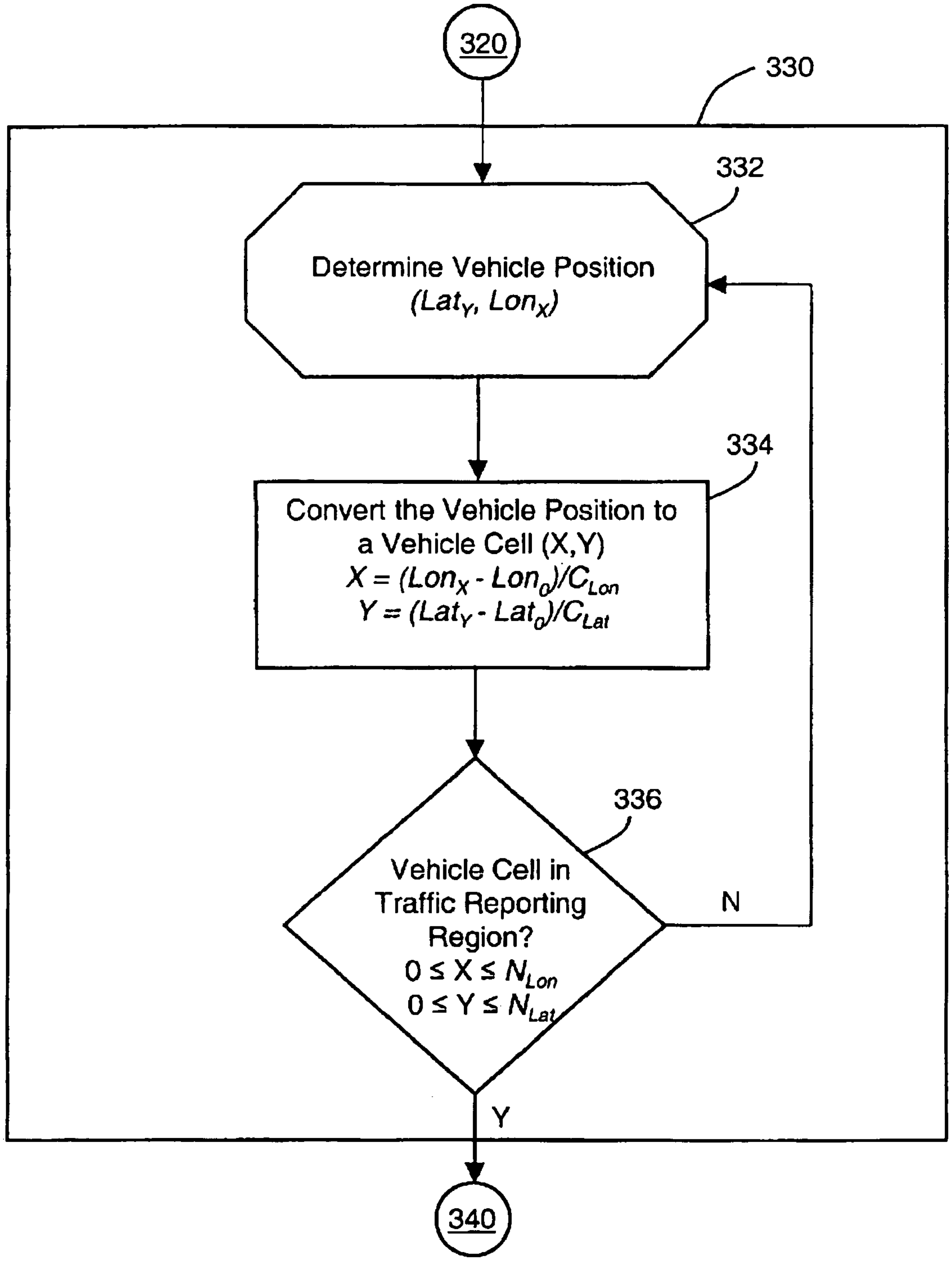
FIG. 4 is a flowchart illustrating an embodiment of a step of the method of FIG. 3.

Referring to FIGS. 3-5, method 300 also comprises the step of determining 330 the vehicle position relative to the geographic region; and if the vehicle is within the geographic region, correlating the vehicle position to the corresponding cell 420 in array 410 to establish a vehicle cell 430. The vehicle position may be determined using GPS information received from GPS unit 245. The vehicle position relative to geographic region 400 may be determined by comparison. For example, if geographic region 400 is defined as a range of latitudes and longitudes, the latitude and longitude comprising the vehicle position may be compared with the range to determine whether it falls within the range or outside of the range using known methods for making such a comparison. If the vehicle position is within the region, the vehicle position is correlated to the cell within the region in which the vehicle is located. This cell may be designated as the vehicle cell. One embodiment for determining the vehicle position 330 and making such a comparison is illustrated in FIG. 4 as a series of steps, comprising determining 332 the vehicle position as described herein, converting 334 the vehicle position to a vehicle cell (X,Y), and determining 336 whether the vehicle cell is within region 400, and if the vehicle cell is within the region, proceeding to step 340 of method 300. The step of converting the vehicle position to a vehicle cell is illustrated in the example provided below.

Referring to FIG. 3, method 300 also comprises the step of recording 340 vehicle data in accordance with the recording interval of the vehicle cell. Vehicle data comprises any data that may be obtained from vehicle 200, which includes any sensed parameter or value which may be derived or otherwise obtained from a sensed parameter. This may, for example, include the vehicle position (i.e., latitude, longitude and elevation), vehicle speed, vehicle heading, ambient temperature, yaw rate, lateral acceleration, suspension displacement, velocity or acceleration or other sensed parameters. Vehicle data may also include other information available from controller 280. The step of recording 340 comprises creating and storing a record of the vehicle data. This record is recorded in accordance with the recording interval. Recording 340 may be done using known techniques for recording using control module 240 and/or controller 280 or other on-board systems which are adapted to store vehicle data. The record may be stored in a memory register that is in signal communication with control module 240, or in another storage device as described herein.

Referring to FIG. 3, method 300 also comprises the step of reporting 350 the vehicle data to traffic information system 100 in accordance with the traffic reporting interval ($t_r$). Reporting 350 may be performed in any suitable manner, but preferably will utilize one or more elements of system 100, such as wireless carrier system 120, communications network 130 or land network 140 to provide vehicle data to system 100, such as a traffic information system 159 comprising traffic information database 158. Since traffic information is frequently desired about conditions on major roadways, method 300 may be tailored so that vehicles 200 need not transmit data when they are on residential streets or idling in parking lots. On high volume roadways, such as freeways, major highways and other high volume roadways, where only a small percentage of probe vehicles are needed in the total vehicle population (e.g., 2-3%) in order to achieve good system performance, transmissions from a larger number of vehicles may not be desirable. In both of these situations, selectively reducing the information transmitted should have little or no effect on the ability to accurately describe traffic conditions on roadways which are of interest from a traffic information and management perspective using the method 300 of the invention. Therefore, the reporting priorities or reporting intervals of certain of the vehicles 200 in these situations may be set to not report at all, or to report less frequently, respectively, so that the traffic information obtained by system 100 is sufficient to accurately characterize the traffic conditions without receiving unnecessary traffic information. At other times, due to low traffic volumes or fewer than expected probe vehicles on a given roadway, there may not be enough data on a specific road of interest. In this situation, method 300 may be implemented to provide a dynamic data transmission algorithm that could be used to increase the amount of information available about this roadway from the population of probe vehicles available at that specific time, by adjusting the reporting priorities or reporting intervals of certain of the vehicles 200 to higher priorities or shorter reporting intervals, so as to significantly enhance the performance of method 300 with very little incremental cost.

Referring again to FIG. 3, method 300 preferably comprises repeating 360 the steps of determining 330 the vehicle position, recording 340 the vehicle data and reporting 350 the vehicle data for a plurality of cycles. Repeating 360 is preferably performed in conjunction with the execution of control loops associated with control module 240.

Method 300 may also incorporate a step of updating (not illustrated) the information which defines the geographic region. The geographic information may be updated by downloading updated geographic information, such as new geographic traffic reporting regions 400 or modifications to existing regions 400, to vehicle 200 using system 100. The updated information which further defines geographic region 400 may either supplement or replace the information previously stored in vehicle 200.

Method 300 may also incorporate a step of updating (not illustrated) at least one cell parameter. This may be done for any of a number of reasons or purposes. For example, as changes occur within region 400, such as the addition, closure or alteration of roadways, or roadway segments, it is preferable to update the cell parameters for the cells where the changes are made. Also, it may be desirable to dynamically update cell parameters in response to changing traffic, roadway, weather or other conditions, or events such as roadway construction, or other for other purposes. The cell parameters associated with cells may be updated by downloading updated information comprising cell parameters to vehicle 200 using system 100. The updated cell parameters may either supplement or replace the cell parameters previously associated with cells 420.

EXAMPLE

Method 300 may be illustrated by the following illustrative example. The Detroit metropolitan area is approximately 50 km by 50 km, roughly corresponding to a box or region of 0.5° of latitude by 0.5° of longitude. This area can be divided into a 250 by 250 cell array, defined by latitude and longitude, containing 62,500 cells, each cell approximately 0.002° of latitude by 0.002° of longitude on a side. Certain parameters and relationships are described and defined below.

A geographic region comprising the Detroit metropolitan area may be described, for example, as an array comprising:

$Lat_0$=42.2° N $Lon_0$=−83.2° W $N_{Lat}$=250

$N_{Lon}$=250

$C_{deg}$=0.0020

N=62,500 where:

$Lat_0$ is the latitudinal origin (i.e. the latitude of the southwest corner of the box);

$Lon_0$ is the longitudinal origin (i.e. the longitude of the southwest corner of the box);

$N_{Lat}$ the number of latitudinal elements or cells;

$N_{Lon}$ is the number of longitudinal elements or cells;

$C_{deg}$ is the amount of arc in degrees of each cell, and may also be described as $C_{Lat}$ and $C_{Lon}$ where they are each equal to one another;

N is the number of cells in the array, wherein $N=(N_{Lat})(N_{Lon})$; and

T(x,y) represents a table of cell parameters comprising the recording priority which is associated with each of the cells.

The vehicle cell (X,Y) may be determined according to the relationship comprising:

$$X=(Lon_X-Lon_0)/C_{Lon}, \text{ and} \quad (1)$$

$$Y=(Lat_Y-Lat_0)/C_{Lat}, \quad (2)$$

where:

$Lat_Y$ is the latitudinal position of the vehicle;

$Lon_X$ is the longitudinal position of the vehicle;

X is the position of the vehicle cell in the array;

Y is the position of the vehicle cell in the array;

It may be determined whether the vehicle cell is in the geographic traffic reporting region, wherein if:

$0 \leqq X \leqq N_{LON}$, and $0 \leqq Y > N_{LAT}$, then the vehicle cell is within the defined geographic region.

Figure 5A:
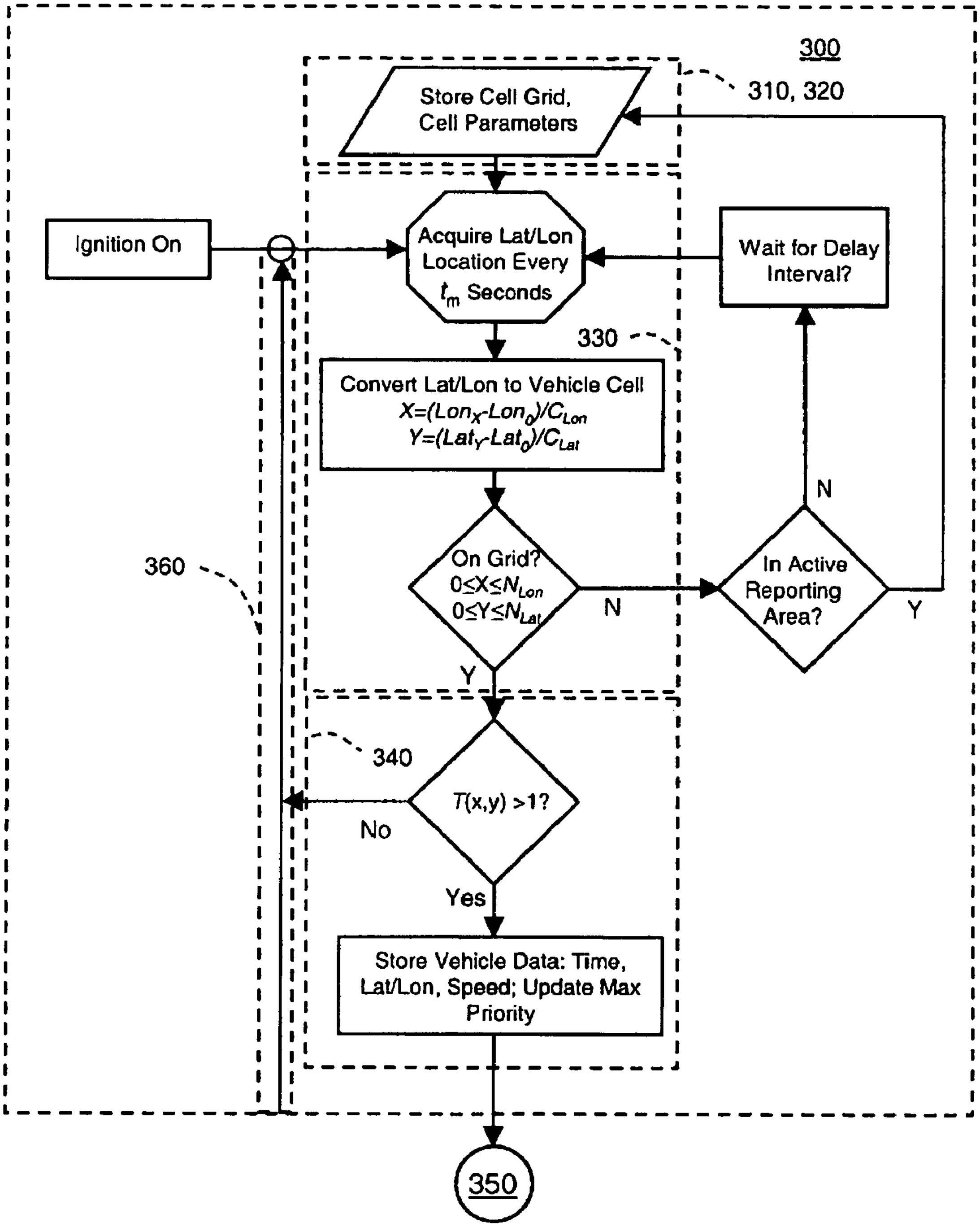
FIG. 5A is a flowchart illustrating a portion of an embodiment of the method of the invention.
Figure 5B:
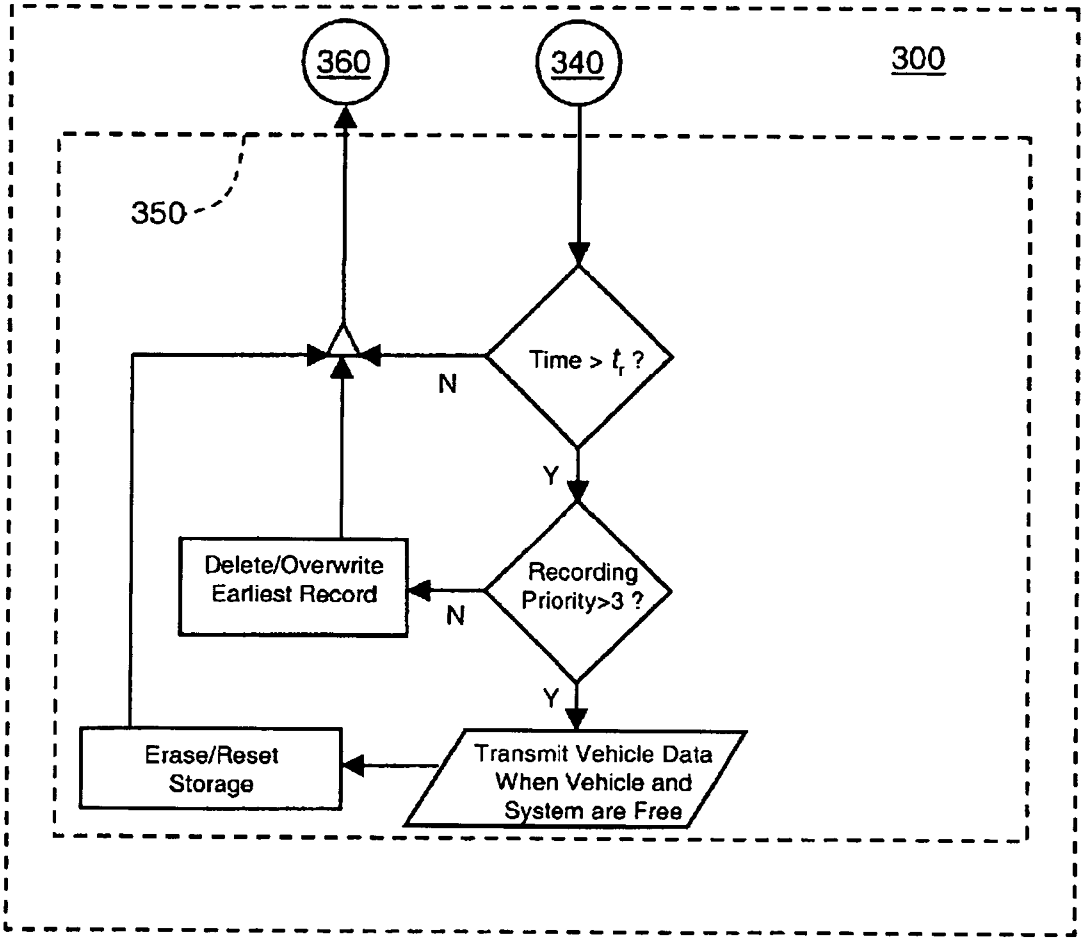
FIG. 5B is a continuation of the flowchart of FIG. 5A.

FIGS. 5A and 5B illustrate an embodiment of the steps of method 300. The cell array and cell parameters are stored in vehicle 200 in conjunction with the steps of storing 310 information which defines a geographic region as an array of geographic cells and associating 320 a plurality of cell parameters with each cell. This is preferably stored in non-volatile memory on vehicle 200 at the time of manufacture, and then periodically updated as described herein. When the vehicle ignition is switched on, the vehicle position and other vehicle data are acquired in accordance with the recording interval. The position data are converted to a vehicle cell and it is determined whether the vehicle is in an active traffic reporting region in conjunction with the step of determining 330 the vehicle position relative to the geographic region. If vehicle 200 is within the traffic reporting region, the vehicle data are recorded 340 in accordance with the recording priority and recording interval of the vehicle cell. The vehicle data are reported 350 to a traffic information system in accordance with the reporting interval. As indicated in FIG. 5B, this may also comprise various tests to determine whether the vehicle 200 and system 100 are available to transmit the vehicle data (i.e. whether either vehicle 200 or system 100 have higher priority tasks). Various tests may also be incorporated to manage the recorded data.

Referring to FIGS. 5A and 5B and Table 1, if a vehicle is in an active area, its on-board memory will contain a copy of array T, and an algorithm implementing method 300 will be on. Also stored is a table of values for the recording interval ($t_m$) and the reporting interval ($t_r$) as well as the origin, $Lat_0$ and $Lon_0$. Values of $t_m$ and $t_r$ refer to the frequency with which the data is logged and transmitted, respectively. Whenever the probe vehicle is running, it collects data and checks the recording priority of its location by looking up the recording priority in the table corresponding to vehicle cell (X,Y).

Various strategies can be implemented based on the resulting priority. For example, the algorithm could set to record all data with a recording priority greater than 1, discarding all data from local roads and parking lots. As the data is collected, the current priority level is updated to reflect the highest priority of the data collected since the last transmission. The priority level determines the collection, storage, and transmission of the data. When the elapsed time since the last transmission equals or exceeds the current value of $t_r$, the stored data is transmitted (when the system is free and available).

Whenever a probe extends outside a box, a new table can be downloaded, or if the probe is not in an area of interest, it simply would not transmit until it is back in an area of interest. This feature allows all units to be manufactured and set up with the hardware and software in place, but only the vehicles that are in an area of interest would transmit data. This makes it easy to implement the traffic information system in one metropolitan area at a time. All vehicles with this system would work anywhere in the U.S., transmitting data of interest when in an implemented or activated area, and not storing or transmitting when the data is not needed.

Figure 7:
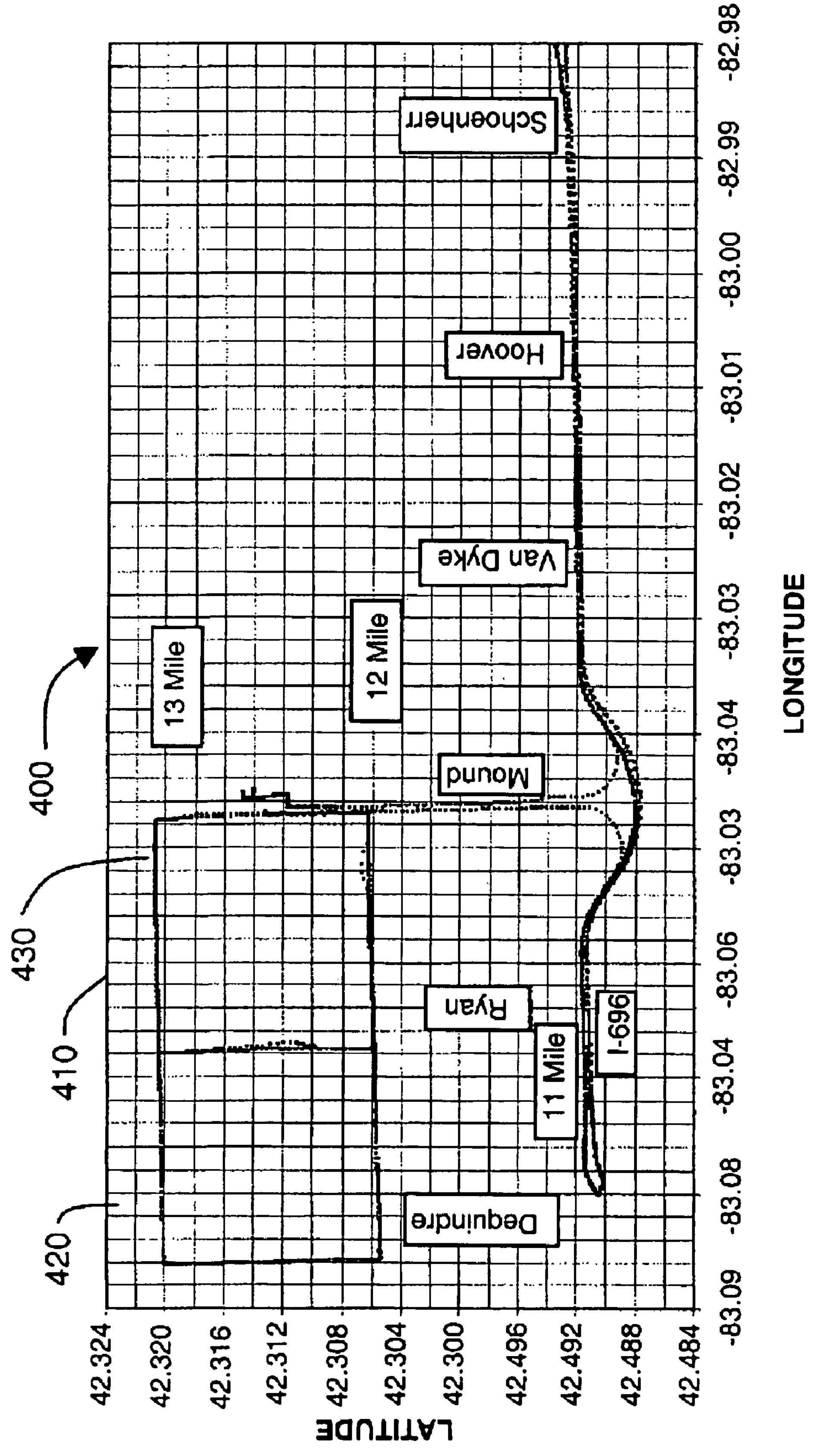
FIG. 7 is a schematic illustration of a geographic region and array of cells of the present invention having vehicle position data superimposed.
Figure 8:
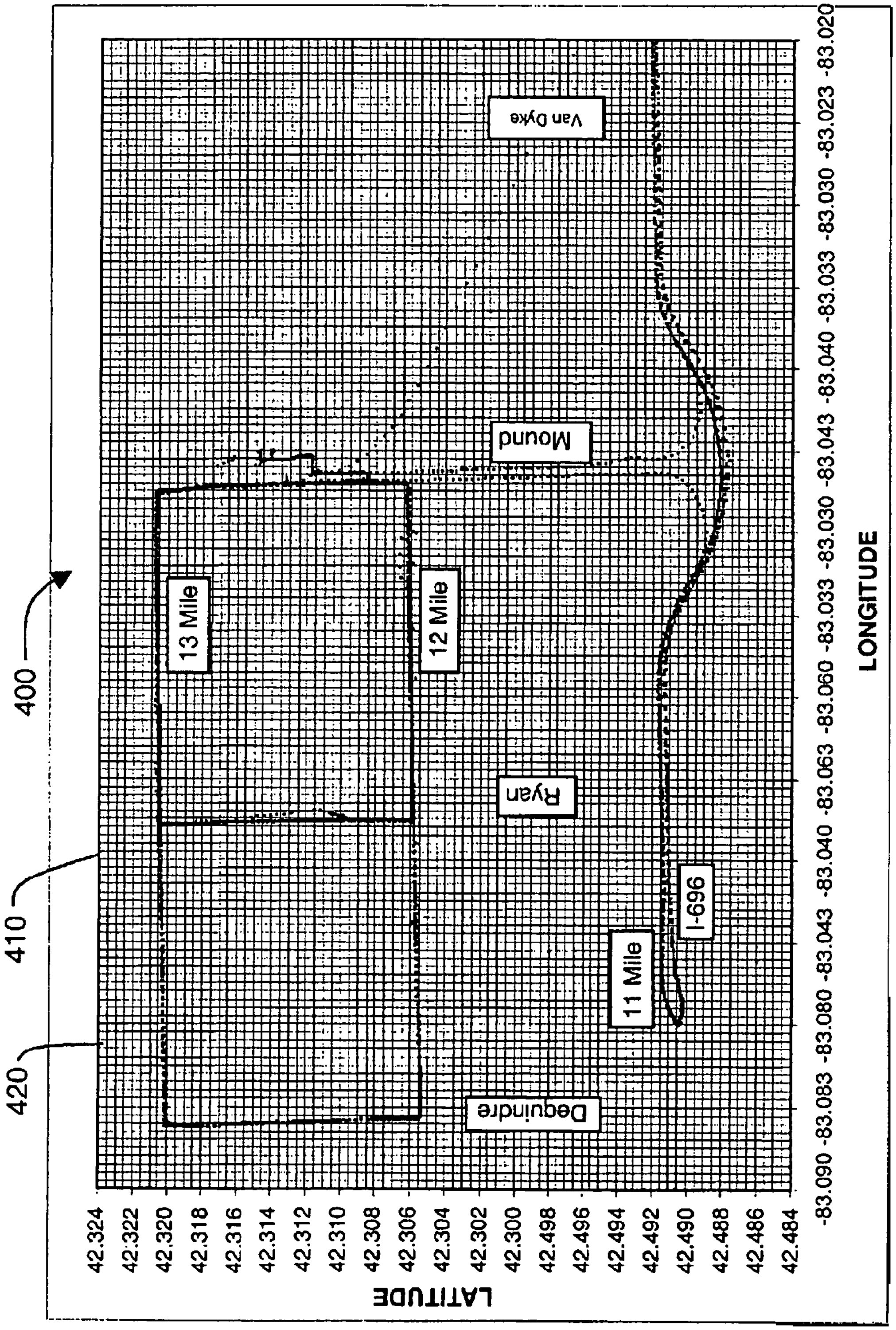
FIG. 8 is second schematic illustration of the geographic traffic reporting region of FIG. 7 at a higher cell resolution having vehicle position data superimposed.

FIGS. 6-8 depict a section of a grid map for the region 400 comprising Warren, Mich. As illustrated in FIG. 6, each cell in the array has a plurality of associated cell parameters comprising a recording priority ($T_{(X,Y)}$), reporting interval ($t_r$) and measurement interval ($t_m$) as shown in Table 1. As shown in Table 1, recording priority may comprise a single digit integer (0-9) that is associated with the roadways that are located within the array, and particularly, the roadway segments which are located within a given cell, wherein the recording priority is a function of the anticipated traffic volume within the cell, particularly the highest priority roadway segment (largest traffic volume) located within a given cell 420. For purposes of this illustration, the priority of cells 420 having a recording priority lower than 3 were not identified in the array. The reporting interval and/or recording interval may be a function of the recording priority as shown in Table 1, or may be established independently. For example, if there are no roads in the (i,j) cell, the corresponding priority T(i,j)=0, and if the cell contains a freeway link, T(i,j)=8, as described in Table 1. Limits may also be established as a function of the recording priority, wherein below a threshold value of the recording priority (e.g., T(x,y)<3), no recording is scheduled and the values of the recording interval and reporting interval are set to appropriately large values so that recording does not occur, or the implementing algorithm is designed so as to not record or report vehicle data associated with the corresponding cell.

FIGS. 7 and 8 illustrate another example of the use of method 300 for map matching, wherein method 300 may be used to identify or confirm certain features associated with a map, such the location of a roadway. FIG. 7 illustrates raw data from an Axiom FMS-2100 GPS unit and data storage unit made by Axiom Navigation, Inc. plotted on the same grid map as shown in FIG. 6. In this example, cell parameters may be selected so as to prioritize data from a particular roadway or roadway segment, or portions thereof (i.e., one or more lanes), such that it is recorded and reported to system 100, wherein the raw data may be used to construct a map showing the precise location of the roadway within the tolerances and accuracy associated with the GPS system. The intent is to provide a simple algorithm that decides what position information is to be transmitted and when the transmission will occur. It is clear from this example that mapping major roads or other geographic features on a 0.002° grid is straightforward and that GPS data is sufficiently accurate to assign a recording priority. For simplicity elevation is ignored in this example. However, by including elevation as part of the vehicle data, it is believed to be possible to develop accurate topographical maps of major roadways. Furthermore, no attempt is made to convert from the geodetic to an earth-centered linear grid system (x and y coordinates above are indices in a look-up table, not linear distances). While the cells within a large grid which is divided into equal latitudinal and longitudinal portions (e.g., 0.002° of latitude and longitude) are neither square nor all the same size, this variation has no impact on method 300, because the vehicle position may simply be correlated to a vehicle cell and reported to system 100.

GPS locations are generally accurate to 10 m, and digital roadmaps are at least as accurate. Each 0.002° by 0.002° cell covers an area of approximately 200 m on a side. Actual cell dimensions vary with location; for example, 0.002° cells in Detroit are approximately 165 m by 220 m, while cells in Houston are approximately 190 m by 220 m. Also, whenever the roadway of interest is near the edge of a cell, the adjacent cell may also be included (see FIG. 6-8). GPS locations that do not correspond to a cell indicating a roadway can arise from at least three scenarios: the vehicle may not be on a road (most likely), or the information about the region is not current, thus the roadway is not known for purposes of method 300, or the GPS vehicle position is in error (occurs approximately 1-3% of the time depending mainly on location). In any of these cases, method 300 may be adapted to exclude the data and either not record the vehicle data, or else not report the data to system 100. On the rare occasion where the incorrect location puts the vehicle in an incorrect cell with a high priority, the data will be transmitted to the base station where the map matching routines may be utilized to reject the data.

It is believed that method 300 could reduce communication to system 100, and hence communication costs, in half or more as compared to currently available methods, without sacrificing performance. In addition, a vehicle utilizing method 300 can be changed dynamically by downloading new cell parameters as needed, and would enable the implementation of more sophisticated traffic analysis algorithms in system 100. For example, if system 100 identifies an area of high interest (such as a suspected traffic incident) it can broadcast new table elements moving cells in the vicinity of the incident to high priority, so that any probes vehicles in those cells will call in with data. If there is more data than is needed for a specific roadway (high volume freeway) the priority of the cells associated with the roadway can be reduced until the traffic volume is reduced.

There are many adjustable parameters associated with method 300 making it very flexible and providing a wide variety of information. Method 300 may be implemented using existing vehicle systems as described herein, with relatively minor modifications, and requires relatively modest additional resources for implementation, such as storage media. For example the box for the Detroit metropolitan area is about 41 km×56 km (extending from Grosse Point to Livonia and from Wyandotte to Pontiac) and the cells are about 165 m by 220 m. The total storage required for the lookup table for the array comprising the region is about 60 kb (depending on how it is stored). The cell size can easily be changed to increase or reduce resolution and storage requirements.

The present invention also has the advantage that it may be incorporated in a population of vehicles sold in various geographic regions, but the method 300 may be selectively enabled/disabled such that a traffic information collection and distribution system based on utilization of method 300 would be implemented or rolled out one geographic region at a time, such as by having an emphasis initially on particular regions such as major metropolitan areas. System 100 can be used to enable the method in the implemented or active geographic regions and disable method 300 geographic regions that are not active. As new geographic regions are implemented, vehicles in those cities may be selectively activated/deactivated by a simple wireless command. Preferably, as vehicles enter and leave a traffic reporting geographic region, they may be activated and deactivated, respectively, thereby optimizing the amount of useful data while eliminating a large amount of unnecessary data transmissions.

Further scope of applicability of the present invention will become apparent from the drawings and this detailed description, as well as the following claims. However, it should be understood that the detailed description and specific examples, while indicating preferred embodiments of the invention, are given by way of illustration only, since various changes and modifications within the spirit and scope of the invention will become apparent to those skilled in the art.

The invention claimed is:

1. A method of reporting information from a vehicle to a vehicle data collection system, comprising:

storing information which defines a geographic region in a vehicle, the geographic region comprising a predetermined array of cells, each cell having a cell position;

associating a plurality of cell parameters with each cell, the cell parameters comprising a recording interval and a reporting interval;

determining a vehicle position relative to the geographic region, wherein if the vehicle is within the geographic region, the vehicle position is correlated to a vehicle cell;

recording vehicle data in accordance with the recording interval of the vehicle cell; and reporting the vehicle data to a vehicle data collection system in accordance with the reporting interval;

repeating said steps of determining the vehicle position, recording the vehicle data and reporting the vehicle data for a plurality of cycles; and, updating the information which defines the geographic region;

wherein the geographic region comprises a plurality of geographic regions and the method may be selectively enabled or disabled for each geographic region.

2. The method of claim 1, further comprising updating at least one cell parameter.

3. The method of claim 1, wherein the vehicle data comprises at least one datum from the group consisting of a vehicle speed, a vehicle heading, the vehicle position, a vehicle elevation and an ambient temperature.

4. The method of claim 1, wherein the cell position comprises a latitudinal position and a longitudinal position.

5. The method of claim 4, wherein the cell position further comprises an elevational position.

6. The method of claim 1, wherein the cell parameters further comprise a recording priority.

7. The method of claim 6, wherein the recording priority of a cell is determined as a function of a roadway type located within the cell.

* * * * *